United States Patent
Ikemori et al.

(10) Patent No.: US 6,327,430 B1
(45) Date of Patent: Dec. 4, 2001

(54) CAMERA HAVING ANTIFOGGING FILM

(75) Inventors: Keiji Ikemori; Keiji Ohtaka, both of Yokohama; Hirokazu Ichiki, Hachiohji, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/358,640

(22) Filed: Jul. 21, 1999

(30) Foreign Application Priority Data

Jul. 27, 1998 (JP) .................................................. 10-210980

(51) Int. Cl.[7] ............................ G03B 13/02; G03B 17/08
(52) U.S. Cl. ................................................ 396/29; 396/373
(58) Field of Search ............................... 396/25, 29, 373; 348/81; 359/507; 524/767

(56) References Cited

U.S. PATENT DOCUMENTS

| | | | |
|---|---|---|---|
| Re. 35,679 | * 12/1997 | Tanaka .............................. | 396/29 X |
| 5,212,509 | * 5/1993 | Kosako et al. ........................ | 396/29 |
| 5,530,499 | * 6/1996 | Mori ..................................... | 396/29 |
| 5,854,341 | * 12/1998 | Yamamoto et al. ................. | 524/767 |

FOREIGN PATENT DOCUMENTS

| | | |
|---|---|---|
| 8-66990 | 3/1996 | (JP) . |
| 11-84473 | 3/1999 | (JP) . |

OTHER PUBLICATIONS

U.S. Patent application Ser. No. 09/145,209.

* cited by examiner

*Primary Examiner*—W. B. Perkey
(74) *Attorney, Agent, or Firm*—Robin, Blecker & Daley

(57) ABSTRACT

A camera, or an underwater camera in particular, includes a photo-taking optical unit for photo-taking an object, and a viewfinder optical unit for observing the object, wherein an antifogging film is applied to an inner side of an optical member which is disposed in an optical path of at least one of the photo-taking optical unit and the viewfinder optical unit and which comes into contact with an external medium relative to the camera.

16 Claims, 3 Drawing Sheets

CAMERA HAVING ANTIFOGGING FILM

BACKGROUND OF THE INVENTION

1. Field of the Invention

The present invention relates to an apparats having an optical window or windows, such as an underwater camera arranged to be usable for underwater photography.

2. Description of Related Art

When an underwater camera is in the atmosphere, optical members forming an optical system and air sealed inside the camera have about the same temperature as the temperature of the atmosphere. Generally, the temperature of water is lower than the temperature of the atmosphere. Therefore, when the underwater camera is placed in the water, an optical member such as an optical window that comes in contact with water is cooled. Then, an aqueous vapor is sometimes generated within the camera and sticks to the inner surface of the optical member to fog the optical member. Such a fogged optical member then has some adverse effects on taking a picture or making an observation. Accordingly, in the conventional underwater camera, such fogging is prevented by arranging optical members (sealing window members) Q that come into contact with water to be in a double-paned structure, as shown in FIG. 3. Incidentally, in FIG. 3, reference numeral 1 denotes a photographing optical system, reference numeral 2 denotes a viewfinder optical system, and reference numeral 3 denotes a film surface, which is set on the image forming plane of the photographing optical system 1.

However, in the conventional structure of the underwater camera such as that shown in FIG. 3, the number of parts of the sealing window members Q is inevitably increased. Therefore, the size and cost of the conventional underwater camera are increased by the arrangement mentioned above.

BRIEF SUMMERY OF THE INVENTION

It is an object of the invention to adequately prevent optical windows of a camera and, particularly, an underwater camera or the like from fogging, in a novel manner which differs from the conventional arrangement.

To attain the above object, in accordance with an aspect of the invention, there is provided a camera, which comprise a photo-taking optical unit for photo-taking an object, and a viewfinder optical unit for observing the object, wherein an antifogging film is applied to an inner side of an optical member which is disposed in an optical path of at least one of the photo-taking optical unit and the viewfinder optical unit and which comes into contact with an external medium relative to the camera.

In particular, the antifogging film has a property of absorbing water.

Further, the camera is an underwater camera having a hermetically sealed construction, and the external medium is water.

The above and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
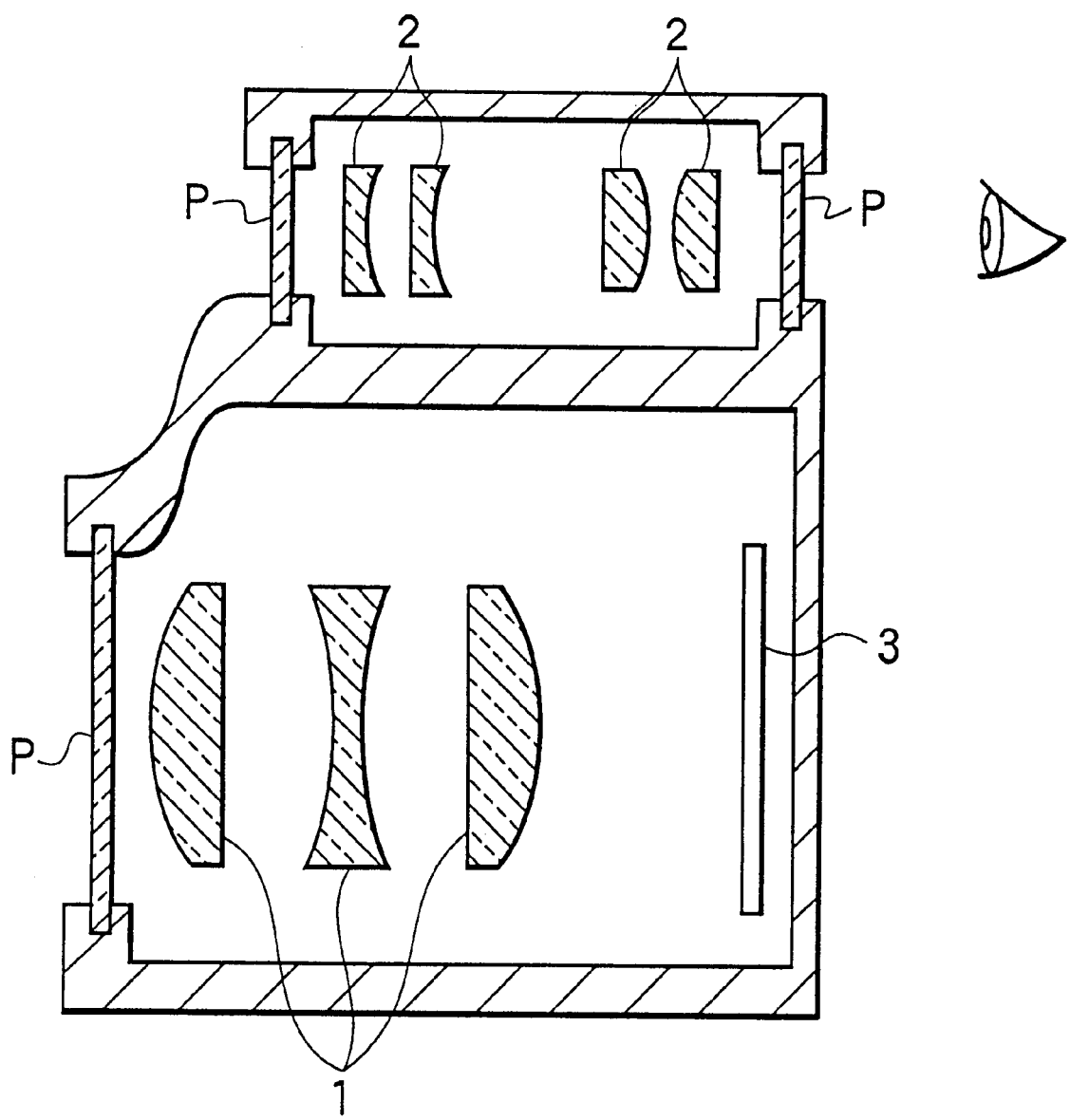
FIG. 1 schematically shows the arrangement of an underwater camera according to an embodiment of the invention.
Figure 3:
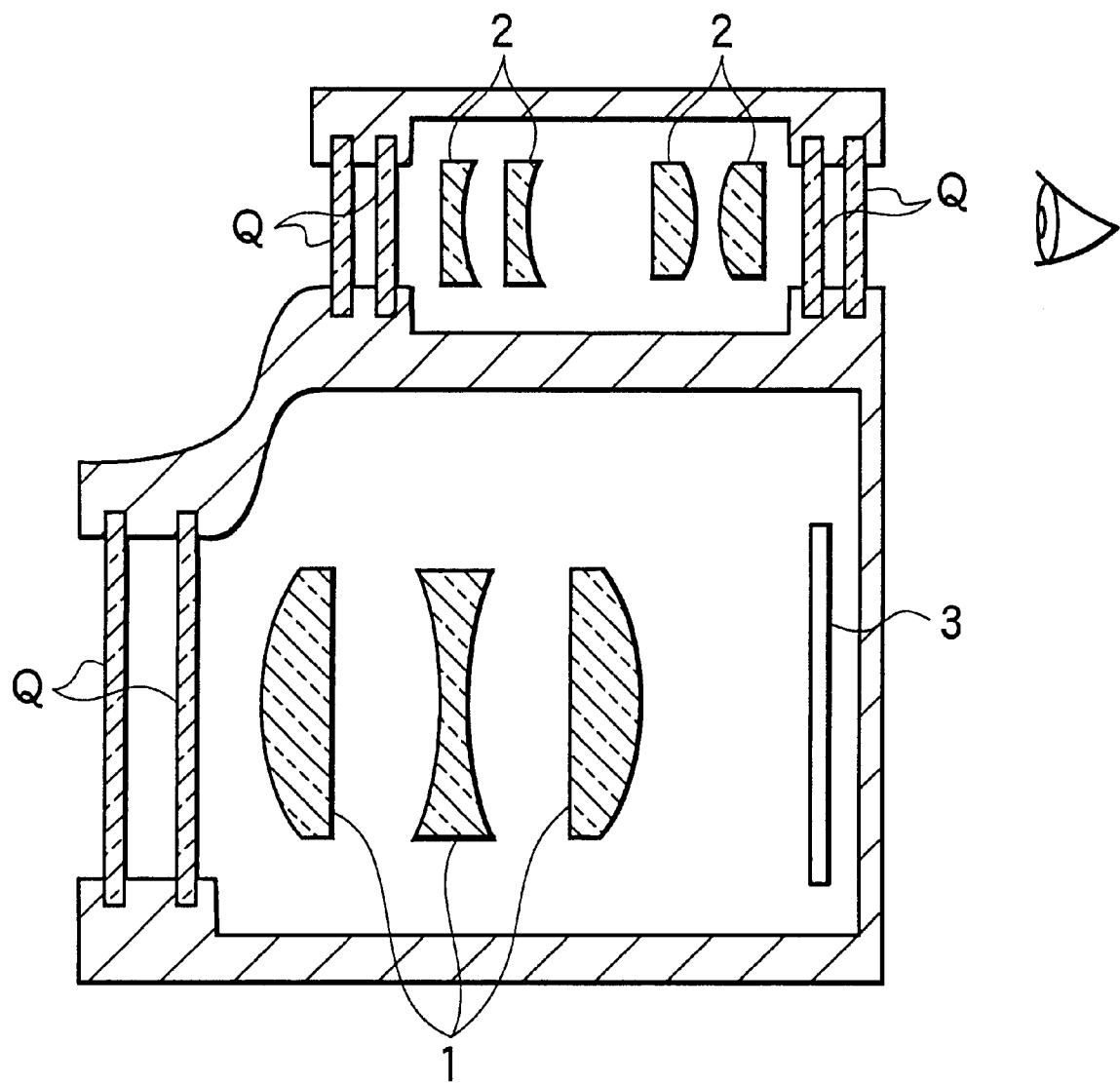
FIG. 3 schematically shows the arrangement of a conventional underwater camera.

FIG. 1 schematically shows the arrangement of an underwater camera according to an embodiment of the invention. The underwater camera shown in FIG. 1 is arranged to have the inside thereof tightly sealed against the outside. When the underwater camera is placed in the water (submerged), the underwater camera sufficiently prevents intrusion of water into its inside. In FIG. 3, reference numeral 1 denotes a photographing optical system, reference numeral 2 denotes a viewfinder optical system, and reference numeral 3 denotes a film surface, which is placed on the image forming plane of the photographing optical system 1. Sealing window members P are disposed in front (on the object side) of the photographing optical system 1 and in front and in rear (on the object side and observing side) of the viewfinder optical system 2. An antifogging film of water absorbability, which will be described later, is formed on the inside surface of each of the sealing window members P.

Tests were conducted for antifogging effect attainable by various underwater cameras, including:

a camera I which was the conventional underwater camera of the double-paned window type as shown in FIG. 3;

a camera II which was the underwater camera according to the embodiment of the invention shown in FIG. 1; and a camera III which was a camera arranged similar to the camera shown in FIG. 1 (of the single-paned window type) but not provided with the antifogging film.

Test conditions were as follows. Each of the cameras I to III was placed within a high temperature tank having a temperature of 40 ° C. and a humidity of 89%, for one hour with its back cover open and, after that, the back cover was closed. With the back cover closed, each camera is moved from the high temperature tank to a low temperature tank having a temperature of −10° C. Generation of fog inside of each camera within the low temperature tank was examined.

The results of the tests were as follows. The optical surfaces of both the cameras I and II did not show any fogging. Photographing shots were taken immediately after the cameras I and II were moved into the low temperature tank. The pictures obtained with the cameras I and II by these shots did not show any adverse effect. The camera III, on the other hand, showed fogging on all the optical surfaces thereof.

The results of tests clearly show that the same antifogging effect as that of the conventional double-paned window type underwater camera can be obtained by the simpler antifogging arrangement of the invention. Since the arrangement of the invention does not require the use of double-paned windows, the camera can be more compactly arranged at lower cost than the conventional camera. Further, if the sealing window members P are arranged to be flat plates, they can be inexpensively manufactured by preparing a large flat panel with the antifogging film formed thereon and by cutting it to the sizes of the sealing window members P. Furthermore, since the antifogging film to be used in accordance with the invention has a property of absorbing water, the quality of pictures taken by the underwater camera is not affected by the use of the antifogging film.

In the underwater camera shown in FIG. 1, the antifogging film is formed only on the inside surfaces of the sealing window members P. However, in a case where the underwater camera is required to have a greater effect of antifogging, the antifogging film is formed not only on the sealing window members P but also on the surfaces of the lenses of the photographing optical system 1 and those of the lenses of the viewfinder optical system 2. The closer the optical members are to the sealing window members P, the more the fogging is apt to take place. It is, therefore, preferable to have the antifogging film applied to the surfaces of the optical members located nearest to the sealing window members P among others.

While the arrangement shown in FIG. 1 is aimed at an underwater camera to be used only under water, the arrangement is applicable also to an underwater photographing housing arranged to permit use of an ordinary camera for underwater photography.

Next, the antifogging film of water absorbability which is used in the invention is described in detail as follows.

Antifogging compounds of varied kinds have been known to be usable for forming an antifogging film having a property of absorbing water. In the embodiment, use is made of an antifogging compound disclosed in Japanese Laid-Open Patent Application No. Hei 8-231944. This antifogging compound is a composition of (1) at least one of inorganic alkoxide and polymers having an OH group formed by hydrolyzing and polycondensating the inorganic alkoxide, (2) polyalkylene oxide, (3) catalyst, and (4) water-containing organic solvent.

The above-stated alkoxide is preferably at least one of compounds expressed by the following formula:

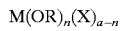

$$M(OR)_n(X)_{a-n}$$

where "M" represents an inorganic atom selected from the group consisting of Si, Al, Ti, Zr, Ca, Fe, V, Sn, Li, Be, B and P, "R" represents an alkyl group, "X" represents an alkyl group, an alkyl group having a functional group, or halogen, "a" represents the valence of M, and "n" represents an integer of from "1" to "a".

With respect to the polyalkylene oxide mentioned above, polyethylene oxide is preferably used.

As for the base catalyst mentioned above, N,N-dimethyl-benzyl amine is preferably used.

To the above-stated compound, at least one of polyacrylic acids of varied kinds may be preferably added. Such a polyacrylic acid is selected from among polyacrylic acid, polymethacrylic acid and the salts of them.

Table 1 shows by way of example the composition of the antifogging compound in parts by weight.

TABLE 1

| | |
|---|---|
| 10% polyethylene oxide in methanol solution | 81.52 |
| 5% polyacrylic acid in methanol solution | 0.26 |
| N,N-dimethyl-benzyl amine | 0.01 |
| γ-glycid propyltrimethoxy silane | 13.59 |
| aluminum isopropoxide in ethanol solution | 4.62 |

In accordance with the components shown in Table 1, polyacrylic acid, N,N-dimethyl-benzyl amine and γ-glycid propyltrimethoxy silane were added to a methanol solution of 10% polyethylene oxide (weight-average molecular weight 300,000), with stirring for 10 minutes. After that, a hydrolyzed solution of aluminum isopropoxide (methanol solution of 5% $Al_2O_3$) which was separately prepared was mixed into the components with further stirring for 30 minutes to obtain a solution. The solution thus obtained was coated to the inside surfaces of the sealing window members P. The coating thus formed was dried by heating (baked) at 150° C. for 10 minutes.

The above-stated antifogging compound prevents fogging by its water absorbing property. In order to ensure an adequate antifogging effect, therefore, the antifogging compound must be coated to the surfaces of the optical members to form a film of a certain thickness. In the case of the composition of Table 1, the antifogging film must measure at least 0.1 μm and preferably more than 1 μm in thickness.

However, an excessively thick antifogging film would deteriorate the surface precision of the optical members and the image to be observed. In order that the image is observed without such deterioration, the film thickness of the antifogging compound to be coated to the surfaces of the optical members must be not greater than 20 μm and more preferably be not greater than 5 μm.

In the case of the embodiment of the invention, the optical members (sealing window members) is coated with the antifogging compound by a known coating process, such as a dipping process, a spraying process, a spinning process or the like. If a sufficient thickness cannot be obtained by carrying such a film forming process once, the coating and baking process may be repeated twice or more than twice as necessary.

In a case where an antifogging effect is obtained by coating an antifogging film to the surface of an optical member of the camera, it is desirable to suppress the reflection at that surface as much as possible. Various compositions for such an antifogging film having an anti-reflection effect are conceivable. A method for obtaining an antifogging film having both antifogging property and anti-reflection property with an excellent durability, as disclosed in Japanese Patent Application No. Hei 9-213269, is advantageous usable for the embodiment. According to that method, a high-refractive-index thin film composed of metal alkoxide or at least one kind of material of composites of metal alkoxide and inorganic material is sandwiched in between films of the above-stated antifogging compound.

Figure 2:
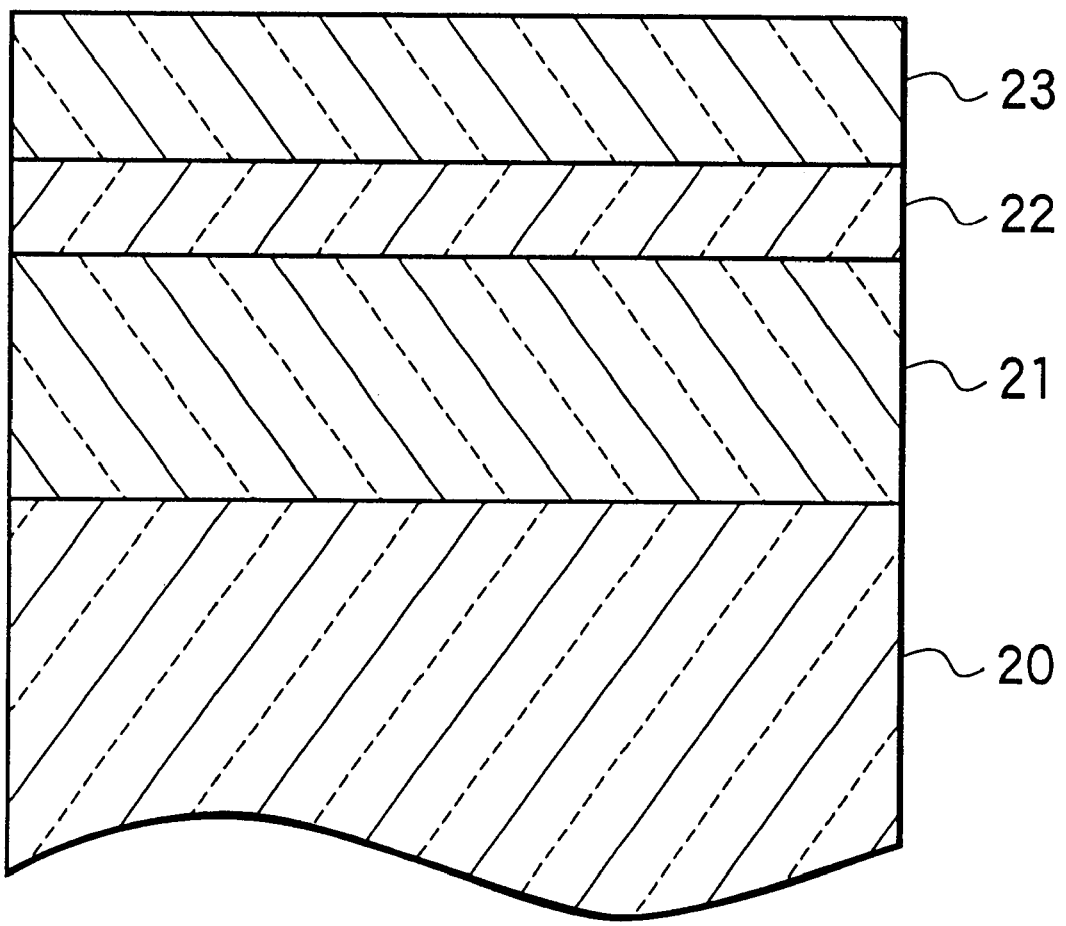
FIG. 2 shows the structure of an antifogging film applied to impart an antireflection effect.

FIG. 2 shows the structure of an antifogging film to which an antireflection property is imparted in accordance with the above-stated method. In FIG. 2, reference numeral 20 denotes a glass base plate, reference numeral 21 denotes a first antifogging film layer, reference numeral 22 denotes a titanium tetraisopropoxide layer, and reference numeral 23 denotes a second antifogging film layer which is composed of the same material as the first antifogging film layer 21. While the glass base plate 20 is expediently shown in FIG. 2 as having a flat surface, it of course may have a certain curvature. The thickness of each of these layers is shown in Table 2.

TABLE 2

| | |
|---|---|
| first antifogging film layer | 3 μm |
| titanium tetraisopropoxide layer | 30 nm |
| second antifogging film layer | 135 nm (*) |

* (optical film thickness)

In Table 2, while the thicknesses of the first antifogging film layer 21 and that of the titanium tetraisopropoxide layer 22 are shown in actual thickness, that of the second antifogging film layer 23 is shown in optical film thickness (refractive index×film thickness).

The first antifogging film layer 21 is obtained by applying the same antifogging compound in the same manner as the embodiment described above. The coating thickness of the first antifogging film layer 21 is determined by considering the antifogging performance and the surface accuracy and is selected from among the range between 0.1 μm and 20 μm, preferably, the range between 1 μm to 10 μm, according to the object of use.

The titanium tetraisopropoxide layer 22 is obtained by coating an isobutyl acetate solution of titanium tetraisopropoxide by the dipping process and by drying the solution. The titanium tetraisopropoxide layer 22 has a refractive index of 1.7 or more and serves to enhance the antireflection effect.

Since the second antifogging film layer 23 is very thin as compared with the first antifogging film layer 21, the antifogging compound has to be diluted to a low viscosity by some solvent or the like before it is coated. The thickness of the second antifogging film layer 23 is set to a value which is ¼ of such a wavelength (design wavelength) as to reduce the reflectance to a lowest value. In this embodiment, the design wavelength is thus set to 540 nm (=135 nm×4).

The invention is not limited to the composition of an antireflection-effect imparting film and the film forming method shown in FIG. 2. In accordance with the invention, it is also possible to employ a method of forming a porous inorganic film on an antifogging film layer, as disclosed in Japanese Patent Application No. Hei 9-212088.

Under an environmental condition which would fog the surface of such an ordinary optical system that has not undergone any antifogging treatment, due condensation would occur not only on the optical system but also on the surface of a member holding the optical system. Then, in the event of a large amount of dew, the dew would become a water droplet and flow to the surface of the optical system.

To prevent or lessen the inflow of such a water droplet, a member which holds an optical member coated with an antifogging film is preferably made of a material having a certain degree of hydrophilic property. With the degree of hydrophilic property assumed to be expressed in a numerical value of the angle of contact with water, the member holding the optical system must be not greater than 90 degrees and more preferably not greater than 70 degrees. In actually carrying out the invention, this requirement can be met either by forming the optical-system holding member with a plastic material that meets such a condition or by forming it to have a finely uneven surface.

The above-stated antifogging film having a water absorbing property is applicable not only to an underwater camera but also to optical windows or the like of other apparatuses such as an optical window in the housing of a surveillance camera, an optical window of a photo sensor. In the field of surveillance cameras, heretofore, the due condensation is prevented by providing the optical window with a heating wire. The use of the antifogging film which is arranged to have the water absorbing property according to the invention, however, not only obviates the necessity of use of such a heating wire for the prevention of the due condensation but also saves the electric energy which is to be applied to the heating wire. In the case of the optical window of a photo sensor, the use of the antifogging film of the invention effectively prevents any erroneous actions due to the due condensation. In a case where such an apparatus is to be used within a gas such as air, the antifogging effect can be more saliently attained by treating not only the inside but also the outside of an optical window with the antifogging film according to the invention, even in the event of a sudden change of temperature.

According to the invention, as described above, there can be provided an apparatus capable of adequately preventing its optical window or optical windows from being fogged.

What is claimed is:

1. A camera comprising:

a photo-taking optical unit for photo-taking an object; and a viewfinder optical unit for observing the object, wherein a water-absorbing antifogging film is formed air-tightly to an inner side of an optical member which is disposed in an optical path of at least one of said photo-taking optical unit and said viewfinder optical unit and which comes into contact with an external medium relative to said camera, and a film having an antireflection property is formed on said antifogging film.

2. A camera according to claim 1, wherein said camera is an underwater camera having a hermetically sealed construction, and said external medium is water.

3. A camera according to claim 1, wherein said optical member having said antifogging film applied thereto is a flat plate.

4. A camera according to claim 1, wherein said antifogging film is composed of a composition including at least one of inorganic alkoxide and polymers having an OH group formed by hydrolyzing and polycondensating the inorganic alkoxide.

5. A camera according to claim 1, wherein the thickness of said antifogging film is not less than 0.1 $\mu$m and not greater than 20 $\mu$m.

6. A camera according to claim 1, wherein said film having the antireflection property is a high-refractive-index thin film composed of metal alkoxide or at least one kind of material of composites of metal alkoxide and inorganic material.

7. A camera according to claim 1, wherein said film having the antireflection property is a porous inorganic film.

8. A camera according to claim 2, wherein a member which holds said optical member having said antifogging film applied thereto has an angle of contact with water of not greater than 90 degrees.

9. A housing for housing therein and sealing a camera to enable underwater photography, comprising:

a casing which houses and seals the camera;

an optical member disposed in an optical path of the camera and provided in the casing so as to come into contact with an external medium relative to the housing, and a water-absorbing antifogging film is formed air-tightly to an inner side of the optical member, and a film having an antireflection property is formed on said antifogging film.

10. A housing according to claim 9, wherein the external medium is water.

11. A housing according to claim 9, wherein said optical member having said antifogging film applied thereto is flat.

12. A housing according to claim 9, wherein said antifogging film is composed of a composition including at least one of inorganic alkoxide and polymers having an OH group formed by hydrolyzing and polycondensating the inorganic alkoxide.

13. A housing according to claim 9, wherein the thickness of said antifogging film is not less than 0.1 $\mu$m and not greater than 20 um.

14. A housing according to claim 9, wherein said film having the antireflection property is a high-refractive-index thin film composed of metal alkoxide or at least one kind of material of composites of metal alkoxide and inorganic material.

15. A housing according to claim 9, wherein said film having the antireflection property is a porous inorganic film.

16. A housing according to claim 10, wherein a member which holds said optical member having said antifogging film is applied thereto has an angle of contact with water of not greater than 90 degrees.

* * * * *

UNITED STATES PATENT AND TRADEMARK OFFICE
CERTIFICATE OF CORRECTION

PATENT NO.    : 6,327,430 B1
DATED         : December 4, 2001
INVENTOR(S)   : Keiji Ikemori et al.

It is certified that error appears in the above-identified patent and that said Letters Patent is hereby corrected as shown below:

Column 3,
Line 36, delete "a-functional" and insert -- a functional --.

Signed and Sealed this

First Day of October, 2002

Attest:

Attesting Officer

JAMES E. ROGAN
Director of the United States Patent and Trademark Office